(12) United States Patent
Prill et al.

(10) Patent No.: US 8,181,720 B2
(45) Date of Patent: May 22, 2012

(54) SEALING SYSTEM AND BI-DIRECTIONAL THRUST BEARING ARRANGEMENT FOR A DOWNHOLE MOTOR

(75) Inventors: Jonathan Ryan Prill, Edmonton (CA); Frederick Pheasey, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 147 days.

(21) Appl. No.: 12/823,444

(22) Filed: Jun. 25, 2010

(65) Prior Publication Data

US 2010/0326730 A1 Dec. 30, 2010

Related U.S. Application Data

(60) Provisional application No. 61/220,305, filed on Jun. 25, 2009, provisional application No. 61/223,610, filed on Jul. 7, 2009.

(51) Int. Cl.
*E21B 4/02* (2006.01)
(52) U.S. Cl. ............... 175/107; 310/87; 384/606
(58) Field of Classification Search ............ 175/57, 175/107, 320; 310/87, 90; 384/606, 607
See application file for complete search history.

(56) References Cited

U.S. PATENT DOCUMENTS

| | | |
|---|---|---|
| 1,643,338 A | 9/1927 | Halvorsen |
| 4,493,381 A | 1/1985 | Kajikawa et al. |
| 4,511,193 A | 4/1985 | Geczy |
| 4,577,704 A | 3/1986 | Aumann |
| 5,195,754 A | 3/1993 | Dietle |
| 5,248,204 A | 9/1993 | Livingston et al. |
| 5,367,214 A * | 11/1994 | Turner, Jr. ............ 310/87 |
| 5,385,407 A * | 1/1995 | De Lucia ............. 384/97 |
| 6,250,806 B1 | 6/2001 | Beshoory |
| 2005/0269885 A1* | 12/2005 | Knox et al. .......... 310/87 |
| 2011/0214920 A1* | 9/2011 | Vail et al. ............. 175/57 |

FOREIGN PATENT DOCUMENTS

| | | |
|---|---|---|
| CA | 2026630 | 5/1994 |
| CA | 2026630 C | 5/1994 |

OTHER PUBLICATIONS

International Search Report and Written Opinion, ISA/KR, Korean Intellectual Property Office, Choi, Jeong Silk (Authorized Officer), Feb. 1, 2011, Application No. PCT/US2010/039954 (9 pp).
PCT/US2010/039954 International Search Report and Written Opinion, Feb. 1, 2011 (9 p.).

\* cited by examiner

*Primary Examiner* — Daniel P Stephenson
(74) *Attorney, Agent, or Firm* — Conley Rose, P.C.

(57) ABSTRACT

A bearing assembly for a downhole motor comprises a housing having an upper end, a lower end, a radially inner surface, and a radially outer surface. In addition, the bearing assembly comprises a mandrel rotatably disposed within the housing. Further, the bearing assembly comprises an upper seal assembly, a lower seal assembly, and a thrust bearing assembly, each radially positioned between the housing and the mandrel. The bearing assembly also comprises a lubricating fluid radially disposed between the housing and the mandrel. The lower end of the housing comprises a first check valve radially positioned between the radially inner surface and the radially outer surface of the housing. The check valve is in fluid communication with the lubricating fluid and is adapted to allow at least a portion of the lubricant to exit the bearing assembly at a predetermined pressure differential.

21 Claims, 6 Drawing Sheets

SEALING SYSTEM AND BI-DIRECTIONAL THRUST BEARING ARRANGEMENT FOR A DOWNHOLE MOTOR

CROSS-REFERENCE TO RELATED APPLICATIONS

This application claims benefit of U.S. provisional patent application Ser. No. 61/220,305 filed Jun. 25, 2009, and entitled "Sealing System and Bi-Directional Thrust Bearing Arrangement in a Downhole Motor Bearing Assembly," which is hereby incorporated herein by reference in its entirety. This application also claims benefit of U.S. provisional patent application Ser. No. 61/223,610 filed Jul. 7, 2009, and entitled "Sealing System and Bi-Directional Thrust Bearing Arrangement in a Downhole Motor Bearing Assembly," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to downhole motors and pumps for oil and gas wells. More particularly, invention relates in general to bearing assemblies for downhole motors and pumps used to drill wells and recover oil and gas from wells.

2. Background of the Technology

In drilling a borehole (or wellbore) into the earth, such as for the recovery of hydrocarbons or minerals from a subsurface formation, it is conventional practice to connect a drill bit onto the lower end of a "drill string", then rotate the drill string so that the drill bit progresses downward into the earth to create the desired borehole. A typical drill string is made up from an assembly of drill pipe sections connected end-to-end, plus a "bottom hole assembly"(BHA) disposed between the bottom of the drill pipe sections and the drill bit. The BHA is typically made up of sub-components such as drill collars, stabilizers, reamers and/or other drilling tools and accessories, selected to suit the particular requirements of the well being drilled. Often a drilling jar is employed in the BHA to aid in freeing a drill string that has become stuck in the hole. The drilling jar is usually positioned above the uppermost stabilizer in a BHA.

In borehole drilling operations, the drill string and bit are rotated by means of either a "rotary table" or a "top drive" associated with a drilling rig erected at the ground surface over the borehole (or in offshore drilling operations, on a seabed-supported drilling platform or suitably-adapted floating vessel). During the drilling process, a drilling fluid (commonly referred to as "drilling mud" or simply "mud") is pumped under pressure downward from the surface through the drill string, out the drill bit into the wellbore, and then upward back to the surface through the annular space ("wellbore annulus") between the drill string and the wellbore. The drilling fluid carries borehole cuttings to the surface, cools the drill bit, and forms a protective cake on the borehole wall (to stabilize and seal the borehole wall), as well as other beneficial functions. At surface the drilling fluid is treated, by removing borehole cuttings, amongst other possible treatments, then re-circulated by pumping it downhole under pressure through the drill string.

As an alternative to rotation by a rotary table or top drive alone, a drill bit can also be rotated using a "downhole motor" incorporated into the drill string immediately above the drill bit. The technique of drilling by rotating the drill bit with a downhole motor without rotating the drill string is commonly referred to as "slide" drilling. It is common in certain types of well-drilling operations to use both slide drilling and drill string rotation, at different stages of the operation. The increased use of downhole motors is mostly attributable to their employment in the drilling of wellbores directionally, and such motors are generally considered to enhance the control and productivity of drilling of such wellbores.

A typical downhole motor includes a top sub, a hydraulic drive section, a drive shaft, a bearing assembly, and a bottom sub. The top sub connects the motor to the drill string and the bottom sub connects the motor to a drill bit. In general, the term "sub" refers to any small or secondary drill string segment or component. The hydraulic drive section, also known as a power section or rotor-stator assembly, includes a helical rotor rotatably disposed within a stator. The drive shaft is enclosed within a drive shaft housing and has an upper end connected to the rotor of the power section. The bearing assembly includes a mandrel with an upper end coupled to the lower end of the drive shaft and a lower end adapted to receive the drill bit. In general, the bearing assembly functions to protect the motor from off bottom and on bottom axial forces while simultaneously permitting rotation of the rotor and driveshaft.

The downhole motor, which may also be referred to as a mud motor or progressive displacement motor (PDM), converts hydraulic energy of a fluid such as drilling mud into mechanical energy in the form of rotational speed and torque output, which may be harnessed for a variety of applications such as downhole drilling. In particular, the high pressure drilling fluid or mud is pumped under pressure between the rotor and stator, causing the rotor, as well as the drill bit coupled to the rotor, to rotate relative to the stator. In general, the rotor has a rotational speed proportional to the volumetric flow rate of pressurized fluid passing through the hydraulic drive section.

Bearing assemblies for mud motors are typically one of two types—either a mud-lubricated bearing assembly or a sealed oil-bath bearing assembly. Unsealed, mud lubricated bearing assemblies are often employed in order to eliminate the difficulties associated with successfully implementing a rotary seal which is capable of withstanding the unusually hostile conditions of the downhole drilling environment. In unsealed bearing assemblies, the radial loads from the bit are carried by elastomer marine bearings, and the axial loads are carried by a ball or roller thrust bearings, often made from tungsten carbide to enhance abrasion resistance. The radial and the thrust bearings are cooled and lubricated by the diversion of a small amount of the circulating drilling fluid. In general, unsealed bearing sub-assemblies have a limited operating life as compared to sealed oil-bath system due to accelerated bearing wear. This limitation undesirably increases drilling costs by requiring frequent trips out of the hole for motor replacement.

Sealed bearing assemblies are filled with bearing lubricant which is pressure balanced to the drilling fluid pressure in the drill string bore. The lubricant is retained within the housing and isolated from the drilling fluid by means of rotary sealing elements at each end of the housing. As the drilling fluid passes through the drill bit jets and enters the annulus of the well, its pressure typically drops 500 to 1,500 psi below the drill string bore pressure. Consequently, the seal arrangement of most conventional sealed bearing assemblies must withstand a 500 to 1,500 psi pressure drop between the bearing lubricant and the drilling fluid in the well annulus.

The durability of a downhole motor and sealed bearing assembly depend, at least in part, on the function of the bearing assembly seals. Bearing failure in normal operation of a sealed oil-bath bearing assembly of a downhole motor is usually a result of a seal failure, which permits drilling fluid incursion into the space occupied by the bearings. Drilling fluid incursion into the bearing assembly oil reservoir will increase the likelihood of failure during operations and increase the cost of maintenance or repair.

Among other important attributes of a bearing assembly utilized in a downhole motor is its overall length. In general, a shorter length downhole motor bearing assembly will reduce the dimension from the drill bit to the bend in the housing, permitting higher angle build rates in a wellbore when drilling directionally, and reduced stress on the components directly above and below the housing when rotating the downhole motor in the wellbore. Some conventional bearing assembly seal systems employ a lower dynamic seal located in a hydraulic force-balanced piston below the radial and thrust bearings, and an upper dynamic seal located in a hydraulic force-balanced piston above the radial and thrust bearings. However, inclusion of lower force-balanced piston generally increases the distance from the drill bit shoulder on the mandrel to the lower end of the lower radial bearing within the housing and increases the distance between the lower dynamic seal and the lower end of the lower radial bearing. Moreover, deflection and/or run-out between the driveshaft housing and the mandrel is detrimental to the life of dynamic seals. The inclusion of a lower dynamic seal disposed in a moveable, lower force-balance piston increases the distance between the lower end of the radial bearing and the lower dynamic seal, which can exasperate such deflection and/or run-out.

Accordingly, there remains a need for improved sealing arrangements for downhole motor bearing assemblies. Such sealing arrangements would be particularly well-received if they offered the potential to enhance the durability of the downhole motor, reduce the length of the downhole motor, and reduce the distance between the bearings and the lower dynamic seal.

BRIEF SUMMARY OF THE DISCLOSURE

These and other needs in the art are addressed in one embodiment by a bearing assembly for a downhole motor. In an embodiment, the bearing assembly comprises a housing having a central axis, an upper end, a lower end, a through passage extending between the upper end and the lower end, a radially inner surface defining the through passage, and a radially outer surface. In addition, the bearing assembly comprises a mandrel rotatably disposed within the through passage of the housing. Further, the bearing assembly comprises an upper seal assembly radially positioned between the housing and the mandrel. Still further, the bearing assembly comprises a lower seal assembly radially positioned between the housing and the mandrel. The lower seal assembly is axially positioned proximal the lower end of the housing. Moreover, the bearing assembly comprises a thrust bearing assembly radially positioned between the housing and the mandrel. The thrust bearing assembly is axially positioned between the upper seal assembly and the lower seal assembly. The bearing assembly also comprises a lubricating fluid radially disposed between the housing and the mandrel and axially disposed between the upper seal assembly and the lower seal assembly. The lower end of the housing comprises a first check valve radially positioned between the radially inner surface and the radially outer surface of the housing. The check valve is in fluid communication with the lubricating fluid and is adapted to allow at least a portion of the lubricant to exit the bearing assembly at a predetermined pressure differential.

These and other needs in the art are addressed in another embodiment by a method for drilling a borehole. In an embodiment, the method comprises (a) providing a bearing assembly. The bearing assembly comprises a housing having a central axis. In addition, the bearing assembly comprises a mandrel coaxially disposed within the housing. Further, the bearing assembly comprises an upper seal assembly, a lower seal assembly axially positioned below the upper seal assembly, and an intermediate seal assembly axially positioned between the upper seal assembly and the lower seal assembly. Each seal assembly is radially positioned between the housing and the mandrel. Still further, the bearing assembly comprises a first portion of lubricant axially disposed between the upper seal assembly and the intermediate seal assembly and a second portion of lubricant axially disposed between the lower seal assembly and the intermediate seal assembly. Moreover, the bearing assembly comprises a thrust bearing assembly axially disposed between the upper seal assembly and the lower seal assembly, and radially disposed between the housing and the mandrel. The method also comprises (b) coupling the bearing assembly to a rotor-stator assembly and a drill bit. Further, the method comprises (c) pumping a drilling fluid down a drill string through the rotor-stator assembly, the bearing assembly, and the drill bit into an annulus radially positioned between the drill string and a borehole sidewall. Still further, the method comprises (d) restricting fluid communication between the drilling fluid in the drill string and the first portion of lubricant with the upper seal assembly during (c). Moreover, the method comprises (e) restricting fluid communication between the drilling fluid in the annulus and the second portion of lubricant with the lower seal assembly during (c). The method also comprises (f) restricting fluid communication between the first portion of lubricant and the second portion of lubricant with the intermediate seal assembly during (c). Still further, the method comprises (g) flowing a third portion of lubricant from a lubricant chamber disposed in the housing into the second portion of lubricant or flowing at least some of the second portion of lubricant into the lubricant chamber disposed in the housing.

These and other needs in the art are addressed in another embodiment by a downhole motor for powering the rotation of a drill bit. In an embodiment, the downhole motor comprises a power section including a stator and a rotor rotatably disposed in the stator. In addition, the downhole motor comprises a bearing assembly. The bearing assembly comprises a housing having a central axis, an upper end coupled to the stator, and a lower end, and a through passage extending between the upper end and the lower end. Further, the bearing assembly comprises a mandrel rotatably disposed within the through passage of the housing. Still further, the bearing assembly comprises an upper seal assembly radially positioned between the housing and the mandrel. Moreover, the bearing assembly comprises a lower seal assembly radially positioned between the housing and the mandrel. The lower seal assembly is axially positioned below the upper seal assembly. The bearing assembly also comprises an intermediate seal assembly radially positioned between the housing and the mandrel. The intermediate sleeve is axially positioned between the upper seal assembly and the lower seal assembly. In addition, the bearing assembly comprises a thrust bearing assembly radially positioned between the housing and the mandrel. The thrust bearing assembly is axially positioned between the upper seal assembly and the lower seal assembly. Still further, the bearing assembly comprises a lubricating fluid radially disposed between the housing and the mandrel and axially disposed between the upper seal assembly and the lower seal assembly. The intermediate seal assembly divides the lubricating fluid into a first portion axially disposed between the upper seal assembly and the intermediate seal assembly and a second portion axially disposed between the lower seal assembly and the intermediate seal assembly. The lower end of the housing comprises a lubricant chamber radially positioned between a radially inner surface of the housing and a radially outer surface of the housing.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 1:
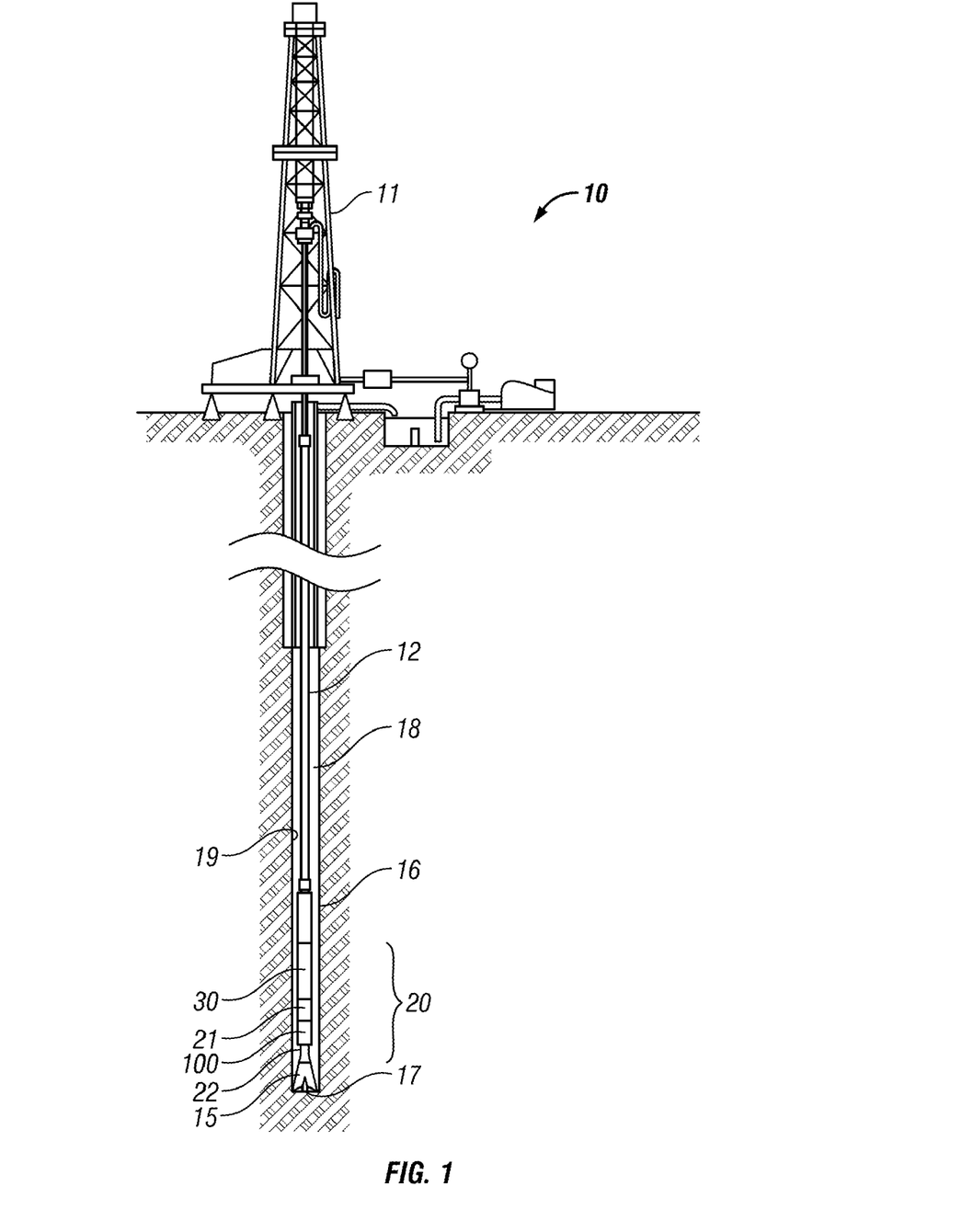
FIG. 1 is a schematic view of an embodiment of a drilling system including a bearing assembly in accordance with the principles described herein.

Referring now to FIG. 1, a downhole drilling system 10 comprises a rig 11, a drill string 12, and a downhole motor 20 coupled to a drill bit 15. Motor 20 includes hydraulic drive or power section 30, a bent housing 21, and a bearing assembly 100 coupled to a drill bit 15. Motor 20 forms part of the bottomhole assembly (BHA) and is disposed between the lower end of the drill string 12 and the drill bit 15. The hydraulic drive section 30 converts drilling fluid pressure pumped down the drill string 12 into rotational energy at the drill bit 15. With force or weight applied to the drill bit 15 via the drill string 12 and/or motor 20, also referred to as weight-on-bit (WOB), the rotating drill bit 15 engages the earthen formation and proceeds to form a borehole 16 along a predetermined path toward a target zone. The drilling fluid or mud pumped down the drill string 12 and through the motor 20 passes out of the drill bit 15 through nozzles positioned in the bit face. The drilling fluid cools the bit 15 and flushes cuttings away from the face of bit 15. The drilling fluid and cuttings are forced from the bottom 17 of the borehole 16 to the surface through an annulus 18 formed between the drill string 12 and the borehole sidewall 19.

Figure 2:
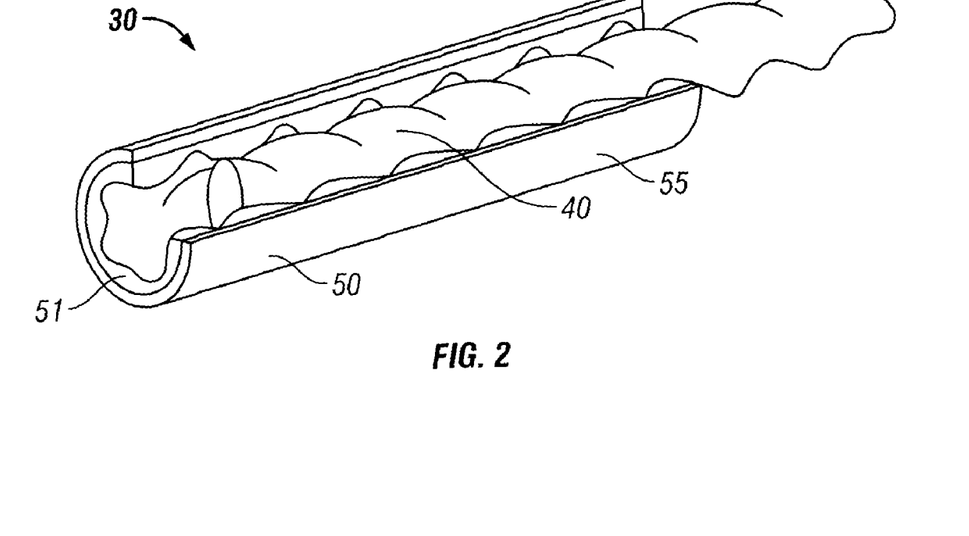
FIG. 2 is a perspective, partial cut-away view of the hydraulic drive section of FIG. 1.
Figure 3:
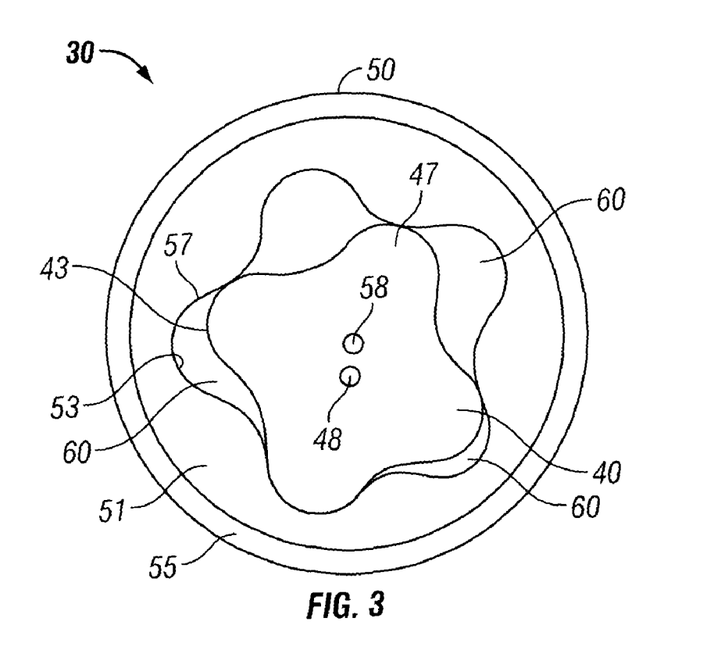
FIG. 3 is a cross-sectional end view of the hydraulic drive section of FIG. 1.

Referring now to FIGS. 2 and 3, hydraulic drive section 30 comprises a helical-shaped rotor 40, preferably made of steel that may be chrome-plated or coated for wear and corrosion resistance, disposed within a stator 50 comprising a heat-treated steel tube 55 lined with a helical-shaped elastomeric insert 51. The helical-shaped rotor 40 defines a set of rotor lobes 47 that intermesh with a set of stator lobes 57 defined by the helical-shaped insert 51. As best shown in FIG. 3, the rotor 40 has one fewer lobe 47 than the stator 50. When the rotor 40 and the stator 50 are assembled, a series of cavities 60 are formed between the outer surface 43 of the rotor 40 and the inner surface 53 of the stator 50. Each cavity 60 is sealed from adjacent cavities 60 by seals formed along the contact lines between the rotor 40 and the stator 50. The central axis 48 of the rotor 40 is offset from the central axis 58 of the stator 50 by a fixed value known as the "eccentricity" of the rotor-stator assembly.

During operation of the hydraulic drive section 30, fluid is pumped under pressure into one end of the hydraulic drive section 30 where it fills a first set of open cavities 60. A pressure differential across the adjacent cavities 60 forces the rotor 40 to rotate relative to the stator 50. As the rotor 40 rotates inside the stator 50, adjacent cavities 60 are opened and filled with fluid. As this rotation and filling process repeats in a continuous manner, the fluid flows progressively down the length of hydraulic drive section 30 and continues to drive the rotation of the rotor 40. Driveshaft 22 shown in FIG. 1 is coupled to the lower end of rotor 40 is also rotated and is used to rotate drill bit 15.

Figure 4:
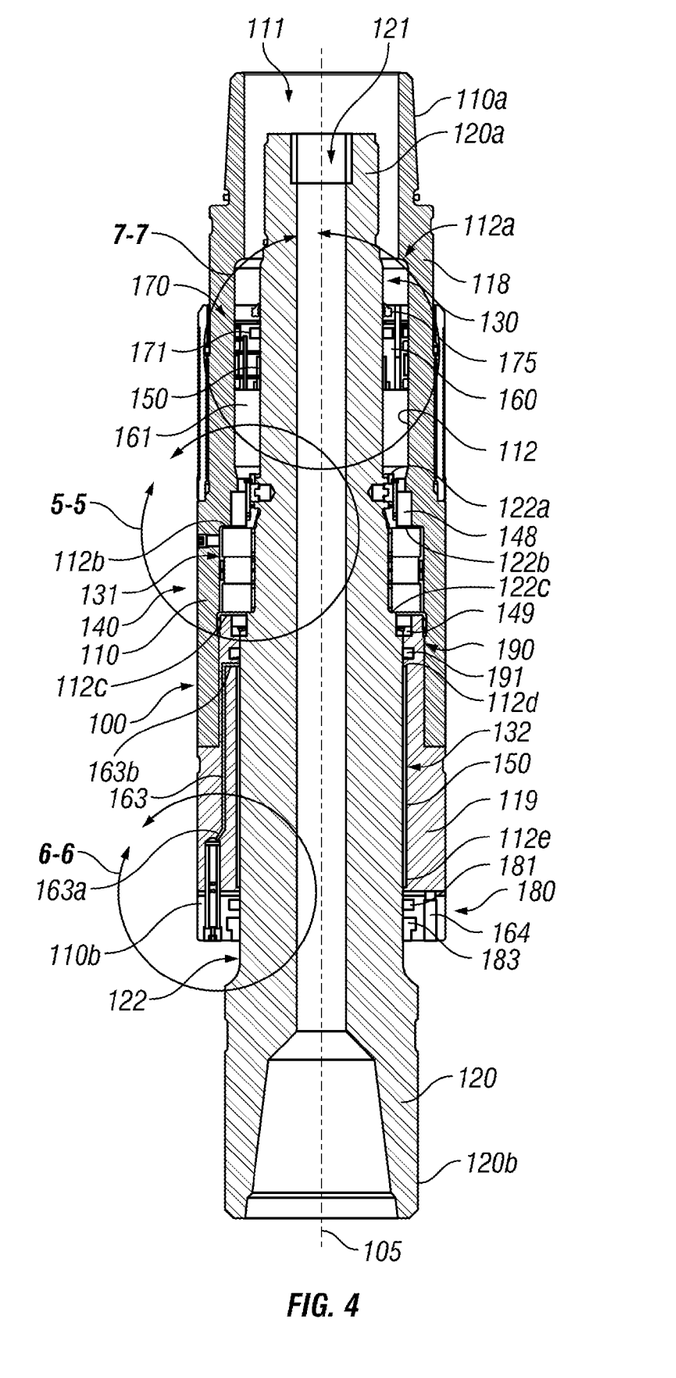
FIG. 4 is an enlarged longitudinal cross-sectional view of the bearing assembly of FIG. 1.

Referring now to FIG. 4, an embodiment of bearing assembly 100 in accordance with the principles described herein is shown. Assembly 100 has a central or longitudinal axis 105, a radially outer bearing housing 110, and a radially inner tubular or mandrel 120 extending axially through housing 110.

Bearing housing 110 has a first or upper end 110a coupled to housing 21, a second or lower end 110b, and a central through passage 111 extending between ends 110a, 110b. In this embodiment, bearing housing 110 includes an upper housing section 118 and a lower housing section 119 partially received by the lower end of upper housing section 118. Together, sections 118, 119 form housing 110.

Mandrel 120 is coaxially disposed within passage 111 of housing 110 and has a first or upper end 120a, a second or lower end 120b, and a central through passage 121 extending between ends 120a, 120b. Upper end 120a of mandrel 120 attaches to the lower end of a driveshaft that extends through housing 21 and is coupled to rotor 40. Lower end 120b of mandrel 120 is coupled to drill bit 15. During drilling operations, mandrel 120 is rotated about axis 105 relative to housing 110. In particular, high pressure drilling mud is pumped through power section 30 to drive the rotation of rotor 40, which in turn drives the rotation of the driveshaft extending through housing 21, mandrel 120, and drill bit 15. The drilling mud flowing through power section 30 flows downstream into upper end 110a of housing 110 and through central passage 121 of mandrel 120 in route to drill bit 15.

Referring still to FIG. 4, housing 110 has a radially inner surface 112 that defines through passage 111. Inner surface 112 includes a plurality of axially spaced apart annular shoulders. Specifically, inner surface 112 comprises a first annular shoulder 112a, a second annular shoulder 112b positioned axially below first shoulder 112a, a third annular shoulder 112c positioned axially below second shoulder 112c, a fourth annular shoulder 112d positioned axially below third shoulder 112c, and a fifth annular shoulder 112e positioned axially below fourth shoulder 112d. Shoulders 112a, 112b are formed along inner surface 112 in upper housing section 118, shoulder 112c is formed by the upper end of lower housing section 119, and shoulders 112d, 112e are formed in lower housing section 119.

Mandrel 120 has a radially outer surface 122 that includes a plurality of axially spaced apart annular shoulders. Specifically, outer surface 122 comprises a first annular shoulder 122a, a second annular shoulder 122b positioned axially below first shoulder 122a, and a third annular shoulder 122c positioned axially below second shoulder 122b. Mandrel shoulder 122a is axially disposed between housing shoulders 112a, 112b, mandrel shoulder 122b is radially adjacent housing shoulder 112b (i.e., mandrel shoulder 122b is at the same axial position as housing shoulder 112b), mandrel shoulder 122c is radially adjacent housing shoulder 112c (i.e., mandrel shoulder 122c is at the same axial position as housing shoulder 112c), and housing shoulders 112d, 112e are axially disposed below mandrel shoulder 122c.

As best shown in FIG. 4, a plurality of annuli are radially positioned between mandrel 120 and housing 110. In particular, a first or upper annulus 130 is positioned axially between housing shoulder 112a and mandrel shoulder 122a, a second or intermediate annulus 131 is positioned axially between shoulders 112b, 122b and shoulders 112c, 122c, and a third or lower annulus 132 is positioned axially between shoulders 112d, 112e. As will be described in more detail below, a thrust bearing assembly 140 is disposed in intermediate annulus 131, an upper radial bearing 150 and a hydraulic force-balance piston 160 are disposed in upper annulus 130, and a lower radial bearing 151 is disposed in lower annulus 132. As will be described in more detail below, piston 160 is free to move axially within annulus 130.

Figure 5:
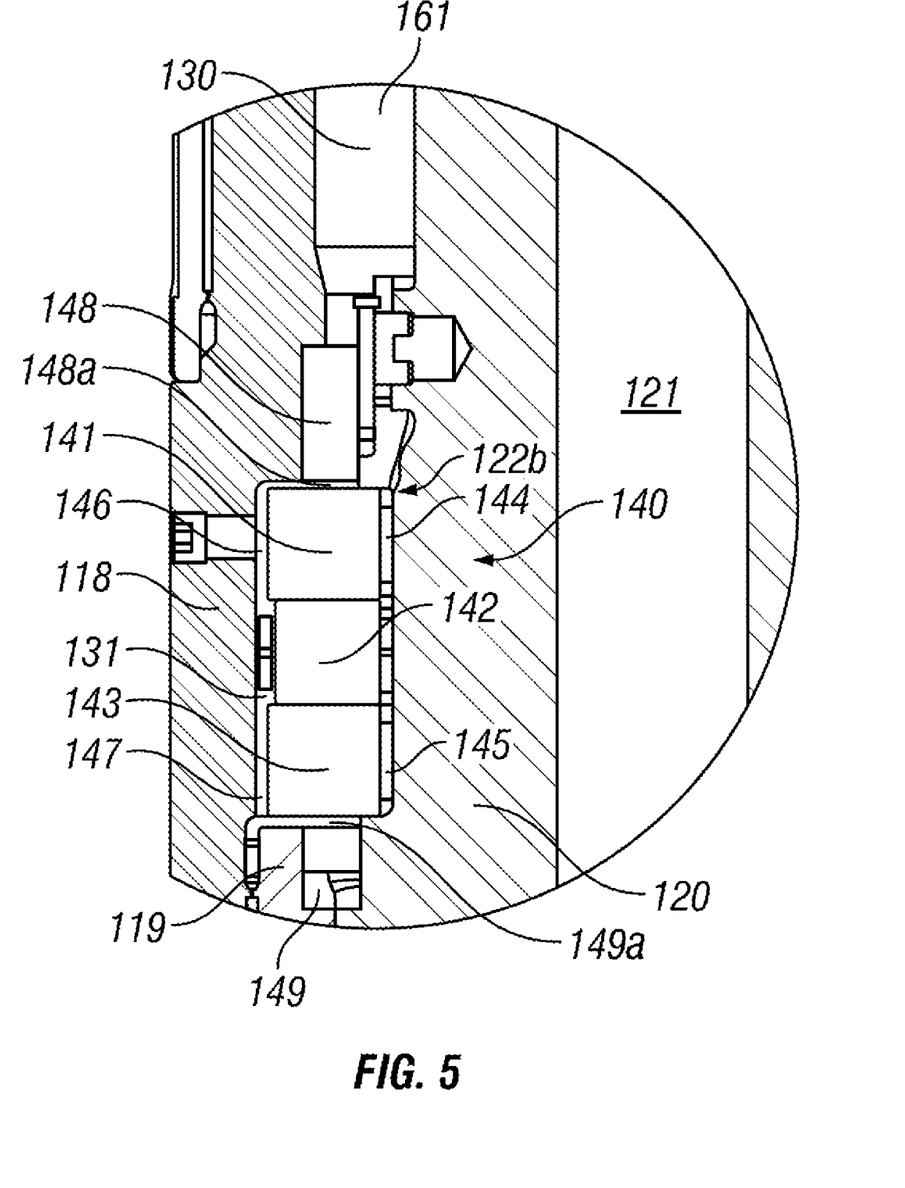
FIG. 5 is an cross-sectional view of the thrust bearing assembly shown in section 5-5 of FIG. 4.

Referring now to FIGS. 4 and 5, annular thrust bearing assembly 140 is disposed about mandrel 120 within second annulus 131. In general, thrust bearing assembly 140 permits rotation of mandrel 120 relative to housing 110 while simultaneously supporting axial forces. Shoulders 112b, 122b defining the axially upper end of second annulus 131 and shoulders 112c, 122c defining the axially lower end of second annulus 131 maintain the axial position of thrust bearing assembly 140 within annulus 131. Accordingly, second annulus 131 may also be referred to as a "four-shouldered" thrust bearing chamber. In other embodiments, the annulus containing the thrust bearing assembly (e.g., annulus 131 containing thrust bearing assembly 140) may be a "two-shoulder" chamber.

In this embodiment, thrust bearing assembly 140 is a roller thrust bearing assembly comprising an upper thrust bearing race 141, a plurality of rollers 142, and a lower thrust bearing race 143. The circumferential spacing of rollers 142 is maintained by a cage positioned between races 141, 143. Thus, bearing cage and rollers 142 are axially positioned between upper race 141 and lower race 143. Thrust bearing assembly 140 supports both on-bottom and off-bottom axial loads. As best shown in FIG. 5, an upper annular alignment bushing 144 is radially positioned between upper bearing race 141 and mandrel 120, and a lower annular alignment bushing 145 is radially positioned between lower bearing race 143 and mandrel 120. Alignment bushings 144, 145 function to maintain the coaxial alignment of bearing races 141, 143, respectively, and mandrel 120. An annular gap or void 146, 147 is radially positioned between each bearing race 141, 143, respectively, and housing 110. Gaps 146, 147 provide sufficient radial clearance to avoid contact between races 141, 43 and housing 110, which may otherwise cause undesirable heat generation and/or seizure.

Referring still to FIG. 5, an upper annular on-bottom race support 148 and a lower annular on-bottom race support 149 ensure that on-bottom axial loads act through the center of force of the thrust bearing assembly 140. In particular, race support 148, 149 is radially positioned at the radial center of bearing race 141, 143, respectively. In other words, race support 148, 149 is radially positioned to engage the radial center of the axial face 148a, 149a, respectively, of bearing race 141, 143, respectively. Such a configuration allows race supports 148, 149 to transfer on-bottom axial loads through the radial center of bearing races 141, 143. In addition, such a configuration offers the potential to eliminate any bending moments in each race 141, 143 due to asymmetric loading.

On-bottom race supports 148, 149 are of a sufficient axial length to ensure that the axial reaction is evenly distributed over the axial faces 148a, 149a of the race supports 148, 149, respectively, interfacing with bearing races 141, 143, respectively. Further, thrust bearing races 141, 143 are of sufficient axial length to ensure that the axial load at faces 148a, 149a, respectively, will be distributed equally across the contact points of rollers 142 with bearing races 141, 143.

Although this embodiment includes a single thrust bearing assembly 140 disposed in one annulus 131, in other embodiments, more than one thrust bearing assembly (e.g., thrust bearing assembly 140) may be included, and further, the thrust bearing assemblies may be disposed in the same or different thrust bearing chambers (e.g., two-shoulder or four-shoulder thrust bearing chambers). In embodiments including separate thrust bearing chambers, employed, the on-bottom thrust bearing is usually (but not necessarily) located above the off-bottom thrust bearing.

Figure 6:
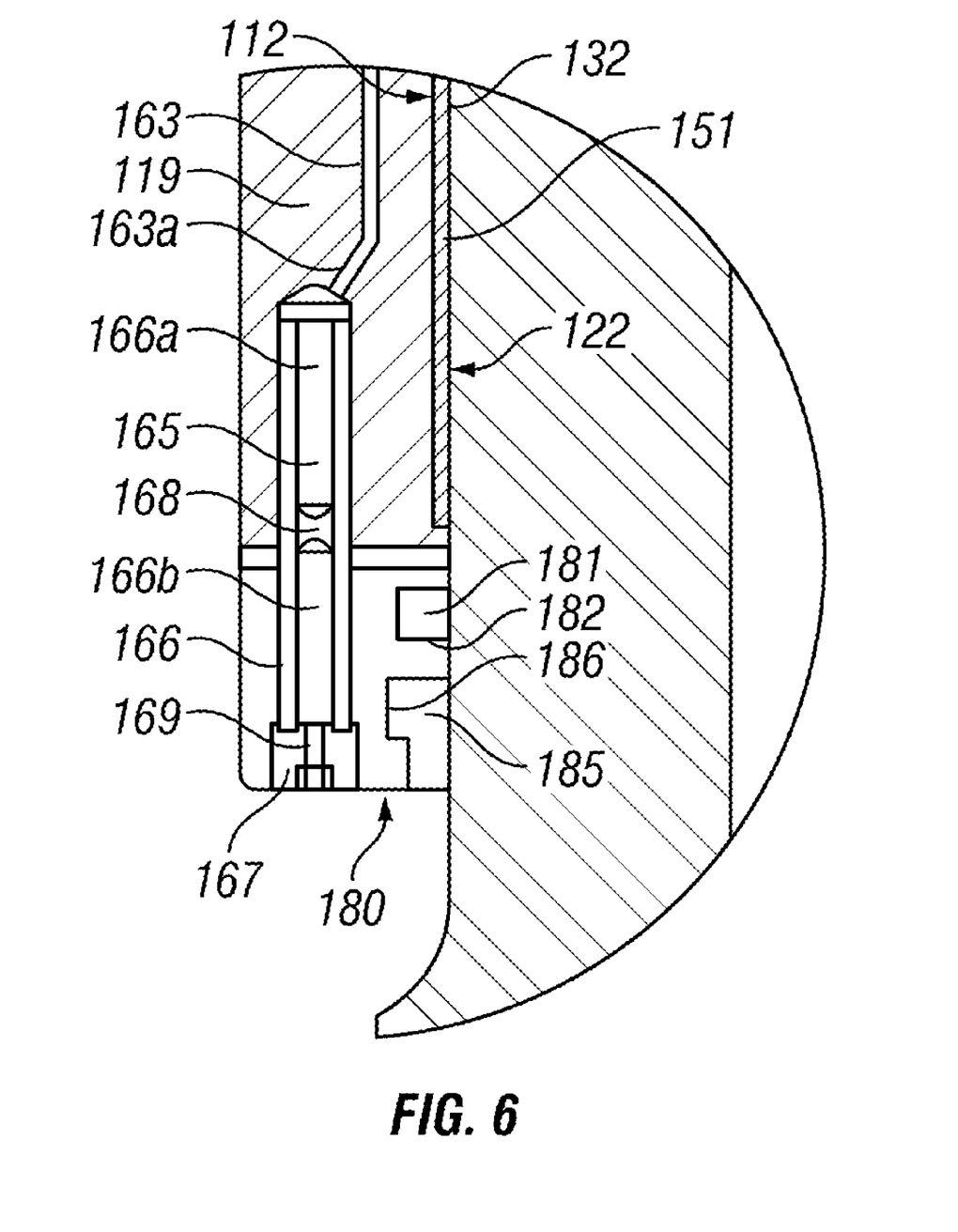
FIG. 6 is an enlarged cross-sectional view of the lower lubricant chamber and lower seal assembly shown in section 6-6 of FIG. 4.
Figure 7:
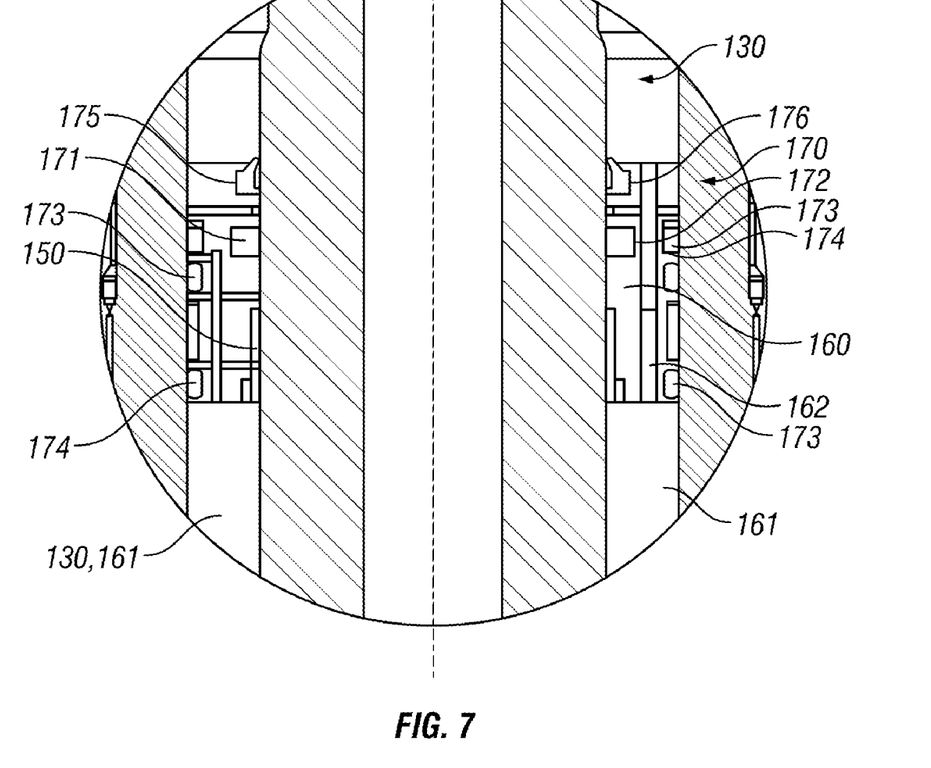
FIG. 7 is an enlarged cross-sectional view of the piston assembly shown in section 7-7 of FIG. 4.

Referring briefly to FIGS. 4, 6, and 7, in this embodiment, upper radial bearing 150 is disposed in upper annulus 131 and lower radial bearing 151 is disposed in lower annulus 132. Thus, upper radial bearing 150 is axially positioned above thrust bearing assembly 140, and lower radial bearing 151 is axially positioned below thrust bearing assembly 140. In general, radial bearings 150, 151 permit rotation of mandrel 120 relative to housing 110 while simultaneously supporting radial forces therebetween. As best shown in FIG. 7, upper radial bearing 150 engages and is positioned radially between piston 160 and mandrel 120, and as best shown in FIG. 6, lower radial bearing 151 engages and is positioned radially between housing 110 and mandrel 120. In this embodiment, upper radial bearing 150 and lower radial bearing 151 are both sleeve type bearings. However, in general, any suitable type of radial bearing(s) may be employed including, without limitation, needle-type roller bearings, radial ball bearings, or combinations thereof.

As previously described, the embodiment shown in FIG. 4 includes upper radial bearing 150, thrust bearing assembly 140, and lower radial bearing 151. However, in other embodiments, different combinations of thrust and/or radial bearings may be employed including, without limitation, deep-groove ball bearings, angular contact ball bearings, single dynamic thrust bearings, ball bearings and a load sharing and preload biasing arrangement as is disclosed in U.S. Pat. No. 4,511,193, which is hereby incorporated herein by reference in its entirety for all purposes, or combinations thereof. For example, a stack of deep-groove ball bearings, capable of supporting bi-directional thrust and radial loads, may be employed in lieu of thrust bearing assembly 140 and lower radial bearing 151. As another example, a stack of angular contact ball bearings, capable of supporting bi-directional thrust and radial loads, may be employed in lieu of thrust bearing assembly 140 and lower radial bearing 151.

Referring now to FIG. 4, bearing assembly 100 is a sealed oil-bath bearing assembly including an upper lubricant reservoir or chamber 161, a lower lubricant reservoir or chamber 165, a plurality of sealing assemblies to restrict and/or prevent drilling mud from (a) contaminating the lubricant or oil in bearing assembly 100, and (b) reaching thrust bearing assembly 140 and radial bearings 150, 151. In this embodiment, bearing assembly 100 includes an upper seal assembly 170, a lower seal assembly 180, and an intermediate seal assembly 190 axially positioned between seal assemblies 170, 180. As will be described in more detail below, upper seal assembly 170 restricts and/or prevents relatively high pressure drilling mud pumped down drill string 12 from flowing axially downward to radial bearings 150, 151 and thrust bearing assembly 140, and lower seal assembly 180 restricts and/or prevents relatively lower pressure drilling mud in annulus 18 from flowing axially upward to radial bearings 150, 151 and thrust bearing assembly 140.

Referring now to FIGS. 4 and 7, upper lubricant chamber 161 is radially positioned between mandrel 120 and housing 110, and is axially positioned between piston 160 and shoulder 122a. Thus, the portion of annulus 130 positioned axially below piston 160 defines lubricant chamber 161. Prior to drilling, lubricant chamber 161 is filled with lubricant, and during drilling, lubricant chamber 161 supplies lubricant to thrust bearing assembly 140 and upper radial bearing 150.

Piston 160 moves axially within annulus 130 in response to any pressure differential between lubricant axially below piston 160 in chamber 161 and drilling fluid axially above piston 160 within passage 111 and annulus 130. For example, if the pressure of drilling fluid axially above piston 160 is higher than the pressure of lubricant in chamber 161, piston 160 will move axially downward within annulus 130, thereby compressing and increasing the pressure of lubricant axially disposed between seal assemblies 170, 190 until it is the same as the drilling mud axially above piston 160. As another example, if the pressure of drilling fluid axially above piston 160 is lower than the pressure of lubricant in chamber 161, piston 160 will move axially upward within annulus 130, thereby expanding the volume of chamber 161 and decreasing the pressure of lubricant axially disposed between seal assemblies 170, 190 until it is the same as the drilling mud axially above piston 160. In this manner, piston 160 maintains a pressure balance between the drilling mud axially above piston 160 within annulus 130 and housing passage 111 at upper end 110a, and the lubricant axially disposed between piston 160 in chamber 161. In other words, piston 160 moves within annulus 130 until there is little to no pressure differential between drilling mud axially above piston 160 within annulus 130 and housing passage 111 at upper end 110a, and the lubricant axially disposed between piston 160 in chamber 161. It should be appreciated that drilling mud is pumped at a relatively high pressure down drill string 12 to bearing assembly 100, and thus, the pressure of drilling mud axially above piston 160 in annulus 130 and housing passage 111 at upper end 110a is relatively high. Since piston 160 maintains a pressure balance between the drilling mud axially above piston 160 within annulus 130 and housing passage 111 at upper end 110a and lubricant axially below piston 160 in chamber 161, the pressure of lubricant axially below piston 160 in chamber 161 is also relatively high.

Referring now to FIGS. 4 and 6, lower lubricant chamber 165 is positioned in lower end 110b of housing 110. In this embodiment, lubricant reservoir 165 comprises a tube 166 screwed into a counterbore in the axial face of housing lower end 110b, a pipe plug 167 having a port 169 disposed in the lower end of tube 166, and a small piston 168 disposed in the bore of tube 166. Thus, tube 166 may be divided into an upper section 166a that is axially above piston 168 and a lower section 166b that is axially below piston 168. Upper section 166a is filled with lubricant and is in fluid communication with annulus 132 and any other voids or gaps radially positioned between mandrel 120 and housing 110 and axially positioned between seal assemblies 180, 190. In this embodiment, a lubricant flow passage 163 extends through lower housing section 119 from a first end 163a at upper section 166a to a second end 163b at inner surface 112 axially between seal gland 192 and lower radial bearing 151. Thus, lubricant chamber 165 can provide lubricant to lower radial bearing 151 disposed in annulus 132. Drilling mud is free to flow through port 169 into lower section 166b. Accordingly, the axially position of piston 168 within tube 166 will depend on the pressure differential between lubricant in upper section 166a and drilling mud from annulus 18 that enters lower section 166b.

Lubricant chamber 165 is designed and configured to accommodate changes in the volume of lubricant in bearing assembly 100 axially positioned between seal assemblies 180, 190 —as the volume of lubricant axially disposed between seal assemblies 180, 190 increases (e.g., due to temperature increase), a portion of it is free to flow into upper section 166a of tube 166, and as the volume of lubricant positioned axially between seal assemblies 180, 190 decreases (e.g., due to temperature decrease), lubricant in upper section 166a of tube 166 is free to flow into annulus 132 and the voids axially disposed between seal assemblies 180, 190. As lubricant moves in and out of upper section 166a of tube 166, piston 168 is free to move axially up and down within tube 166.

In general, piston 168 moves axially within tube 166 in response to any pressure differential between lubricant in upper section 166a and drilling mud in lower section 166b. For example, if the pressure of lubricant in upper section 166a is lower than the pressure of drilling mud in lower section 166b, piston 168 will move axially upward within tube 166, thereby decreasing the volume of upper section 166b, and compressing lubricant axially disposed between seal assemblies 180, 190 until it is the same as the drilling mud in lower section 166b. As another example, if the pressure of lubricant in upper section 166a is higher than the pressure of drilling mud in lower section 166b, piston 160 will move axially downward within tube 166, thereby expanding the volume of upper section 166a and decreasing the pressure of lubricant axially disposed between seal assemblies 180, 190 until it is the same as the drilling mud in lower section 166b. In this manner, piston 168 maintains a pressure balance between the drilling mud in lower section 166b and lubricant in upper section 166a. In other words, piston 168 moves within tube 160 until there is little to no pressure differential between drilling mud in lower section 166b and lubricant in upper section 166a. It should be appreciated that drilling mud in lower section 166b, which is the same drilling mud in annulus 18 proximal lower end 110b, has a lower pressure than the drilling mud pumped down drill string 12 to housing passage 111 at upper end 110a and piston 160 previously described. Since piston 168 maintains a pressure balance between the drilling mud in lower section 166b and lubricant in upper section 166a, the pressure of lubricant in bearing assembly 100 axially positioned between seal assemblies 180, 190 is lower than the pressure of lubricant in bearing assembly 100 axially positioned between seal assemblies 170, 190.

Although lubricant chamber 165 including piston 168 is provided in this embodiment to account for changes in lubricant volume, in general, any suitable means may be provided for accommodating lubricant volume changes including, without limitation, bladders. Further, although lubricant flow passage 163 extends from upper section 166a to inner surface 112 axially between seal gland 192 and lower radial bearing 151 in this embodiment, in general, the lubricant flow passage (e.g., flow passage 163) may extend from the upper section of the lubricant chamber (e.g., upper section 166a) to any suitable location for exchanging (e.g., supplying or receiving) lubricant with voids or gaps radially positioned between the mandrel (e.g., mandrel 120) and the housing (e.g., housing 110) and axially positioned between the lower and intermediate seal assemblies (e.g., seal assemblies 180, 190). For example, in other embodiments, the lubricant flow passage extends from the lubricant chamber to the intermediate seal assembly seal gland (e.g., seal gland 192 of seal assembly 190).

Referring now to FIGS. 4 and 7, upper seal assembly 170 restricts and/or prevents fluid communication between drilling mud in drill string 12 axially above piston 160 and lubricant in chamber 161 axially below piston 160, thereby restricting and/or preventing relatively high pressure drilling mud pumped down drill string 12 from flowing axially downward between mandrel 120 and housing 110 and reaching bearings 150, 151 and thrust bearing assembly 140. As best shown in FIG. 7, in this embodiment, upper seal assembly 170 comprises a radially inner annular seal member 171 radially positioned between piston 160 and mandrel 120, and a plurality of radially outer annular seal members 173 radially positioned between piston 160 and housing 110. Inner seal member 171 is mounted to piston 160 in an annular recess or seal gland 172 formed along the radially inner surface of piston 160. The radially inner surface of seal member 171 forms a dynamic seal with mandrel 120 and the radially outer surface of seal member 171 forms a static seal with piston 160. In addition, each outer seal member 173 is mounted to piston 160 in an annular recess or seal gland 174 formed along the radially outer surface of piston 160. The radially outer surface of each seal member 173 forms a dynamic seal with housing 120 and the radially inner surface of seal member 173 forms a static seal with piston 160. Since seal members 171, 173 are disposed in annular recesses 172, 174, respectively, seal members 171, 173 move axially with piston 160.

In this embodiment, upper seal assembly 170 also includes a wiper 175 radially positioned between piston 160 and mandrel 120, and axially positioned between seal member 171 and the drilling fluid above piston 160. Thus, wiper 175 is axially positioned above seal member 171. Wiper 175 is mounted to piston 160 in an annular recess or gland 176 formed along the radially inner surface of piston 160. The radially outer surface of wiper 175 forms a static seal with piston 160 and the radially inner portion of wiper 175 dynamically engages mandrel 120. In this embodiment, wiper 175 is axially vented to equalize the pressure across wiper 175 (i.e., prevent a pressure drop across wiper 175).

Upper seal assembly 170 restricts and/or prevents fluid communication between drilling mud in drill string 12 axially above piston 160 and lubricant in chamber 161 axially below piston 160. Thus, upper seal assembly 180 faces both drilling mud in drill string 12 and lubricant in chamber 161. However, since there is little to no pressure differential between the drilling mud immediately axially above piston 160 and the lubricant in chamber 161 axially below piston 160, upper seal assembly 170 experiences little to no pressure differential. This offers the potential to reduce the likelihood of extrusion and associated nibbling of seal members 171, 173 in seal assembly 170, and increase the operating lifetime of upper seal assembly 170.

Referring now to FIGS. 4 and 6, lower seal assembly 180 restricts and/or prevents fluid communication between drilling mud in annulus 18 axially adjacent lower end 110b of housing 110 and lubricant axially disposed between seal assemblies 180, 190 (e.g., lubricant in annulus 132), thereby restricting and/or preventing relatively lower pressure drilling mud in annulus 18 from flowing axially upward between mandrel 120 and housing 110 to radial bearings 150, 151 and thrust bearing assembly 140. As best shown in FIG. 6, in this embodiment, lower seal assembly 180 comprises an annular seal member 181 radially positioned between housing 110 and mandrel 120. Specifically, seal member 181 is mounted to housing 110 in an annular recess or seal gland 182 formed along the radially inner surface 112 of housing 110 at lower end 110a. The radially inner surface of seal member 181 forms a dynamic seal with mandrel 120 and the radially outer surface of seal member 181 forms a static seal with housing 110. In this embodiment, lower seal assembly 180 also includes a wiper 185 radially positioned between housing 110 and mandrel 120, and axially positioned between seal member 181 and the drilling fluid in annulus 18 below housing 110. Thus, wiper 185 is axially positioned below seal member 181. Wiper 185 is mounted to housing 110 in an annular recess or gland 186 formed along the radially inner surface 112 of housing 110 at lower end 110b. The radially outer surface of wiper 185 forms a static seal with housing 110 and the radially inner portion of wiper 185 dynamically engages mandrel 120. Similar to wiper 175 previously described, in this embodiment, wiper 185 is axially vented to equalize the pressure across wiper 185 (i.e., prevent a pressure drop across wiper 185).

Lower seal assembly 170 restricts and/or prevents fluid communication between drilling mud in annulus 18 axially adjacent lower end 110b of housing 110 and lubricant axially disposed between seal assemblies 180, 190 (e.g., lubricant in annulus 132). Thus, lower seal assembly 180 faces both drilling mud in annulus 18 and lubricant in axially disposed between seal assemblies 180, 190. However, since there is little to no pressure differential between the drilling mud in annulus 18 adjacent housing lower end 110b and the lubricant between seal assemblies 180, 190 as previously described, lower seal assembly 180 experiences little to no pressure differential. This offers the potential to reduce the likelihood of extrusion and associated nibbling of seal member 181 in seal assembly 180, and increase the operating lifetime of upper seal assembly 180.

Referring now to FIG. 4, intermediate seal assembly 190 is a high pressure seal assembly axially positioned between upper seal assembly 170 and lower seal assembly 180. In this embodiment, seal assembly 190 is axially positioned between intermediate annulus 131 and lower annulus 132, and radially positioned between housing 110 and mandrel 120. Thus, seal assembly 190 restricts and/or prevents fluid communication between annuli 131, 132. In other words, seal assembly 190 isolates lubricant in bearing assembly 100 axially disposed between seal assemblies 170, 190 from lubricant in bearing assembly 100 axially disposed between seal assemblies 180, 190. In this embodiment, seal assembly 190 comprises an annular seal member 191 radially positioned between housing 110 and mandrel 120. Specifically, seal member 191 is mounted to housing 110 in an annular recess or seal gland 192 formed along the radially inner surface 112 of housing 110. The radially inner surface of seal member 191 forms a dynamic seal with mandrel 120 and the radially outer surface of seal member 191 forms a static seal with housing 110.

As previously described, lubricant in bearing assembly 100 axially above seal assembly 190 is at the same pressure as the drilling mud pumped down drill string 12 to piston 160, and lubricant in bearing assembly 100 axially below seal assembly 190 is at the same pressure as drilling mud in annulus 18 proximal lower end 110b. The pressure of drilling mud pumped down drill string 12 to piston 160 is greater than the pressure of drilling mud in annulus 18 proximal housing lower end 110b, and thus, the pressure of lubricant in bearing assembly 100 axially above seal assembly 190 is higher than the pressure of lubricant in bearing assembly 100 axially below seal assembly 190. Accordingly, seal assembly 190 is exposed to a pressure differential, which is about the same as the pressure drop of drilling mud across bit 15. However, in this embodiment, seal assembly 190 functions to seal relatively high pressure lubricant from relatively low pressure lubricant. Thus, as long as seal assemblies 170, 180 are functioning properly, any leakage that occurs across seal assembly 190 will merely be leakage of lubricant, not abrasive drilling mud.

Although seal assemblies 170, 180, 190 are shown in conjunction with thrust bearing assembly 140 and radial bearings 150, 151, in general, embodiments of the seal arrangement described herein (e.g., seal assemblies 170, 180, 190) may be employed with any suitable bearing assembly. In any such alternative embodiments, the bearing assemblies (e.g., thrust bearings, radial bearings, etc.) are preferably axially positioned between upper seal assembly 170 and lower seal assembly 180.

In general, each seal member 171, 173, 181, 191 may comprise any suitable sealing element including, without limitation, O-ring seals, elastomeric seals, hydrodynamic seals, or combinations thereof. Seal members 171, 181 preferably comprise a flat face facing the drilling fluid and a wavy lip facing the lubricant, and seal member 191 preferably comprises a wavy life facing the relatively high pressure lubricant between seal assemblies 170, 190.

Referring now to FIG. 7, in this embodiment, piston 160 includes a check valve 162 that extends axially through piston 160 between the lubricant in chamber 161 and drilling mud in passage 111 at upper end 110a. At a predetermined pressure differential across piston 160, upper check valve 162 allows one-way flow from lubricant from chamber 161 through piston 160 into drilling mud axially above piston 160.

As previously described, annular piston 160 moves axially within annulus 130 in response to any pressure differential between lubricant in lubricant chamber 161 and drilling mud in drill string 12 immediately axially above piston 160. Thus, if the pressure of lubricant in chamber 61 exceeds the pressure of drilling mud in passage 111 at upper end 110a, piston 160 will move axially upward within annulus 130. For example, in the event bearing assembly 100 is lowered into a hot hole, the lubricant within chamber 161 may expand, increase the pressure of the lubricant in chamber 161, and urge piston 160 axially upward. However, once piston 160 axially abuts upper shoulder 112a, piston 160 is prevented from continued upward axial movement within annulus 130. If the pressure of lubricant in chamber 161 is higher than the pressure of drilling mud in passage 111 at upper end 110a when piston 160 engages shoulder 112a, a pressure differential will arise across piston 160 and upper seal assembly 170. If the pressure differential is sufficient to trigger check valve 162 to open (i.e., the pressure differentia reaches the predetermined pressure differential of check valve 162), lubricant in chamber 161 will bleed through check valve 162 into drilling mud axially above piston 160, thereby at least partially relieving the pressure differential across piston 160 and upper seal assembly 170. By allowing lubricant to bleed from lubricant chamber 161 into the drill string bore at a predetermined pressure differential, check valve 162 offers the potential to reduce the likelihood of over-pressuring upper seal assembly 170 and/or intermediate lower seal assembly 190.

Referring now to FIGS. 4 and 6, in this embodiment, a lower check valve 164 is provided in lower end 110b of housing 110. Check valve 164 is in fluid communication with the lubricant axially disposed between seal assemblies 180, 190. At a predetermined pressure differential between the lubricant axially positioned between seal assemblies 180, 190 and the drilling mud in annulus 18 proximal housing lower end 110b, check valve 164 allows one-way flow of lubricant into the drilling mud in annulus 18 proximal housing lower end 110b.

As previously described, piston 168 moves axially within tube 166 in response to any pressure differential between lubricant in upper section 166a and drilling mud in lower section 166b. It should be appreciated that the pressure of lubricant in upper section 166a is the same as the pressure of lubricant axially disposed between seal assemblies 180, 190, and the pressure of drilling mud in lower section 166b is the same as the pressure of drilling mud in annulus 18 proximal housing lower end 110b. If the pressure of lubricant in upper section 166a exceeds the pressure of drilling mud in lower section 166b, piston 168 will move axially downward in tube 166. For example, in the event bearing assembly 100 is lowered into a hot hole, the lubricant axially disposed between seal assemblies 180, 190 and in upper section 166a may expand, increase the pressure of the lubricant in upper section 166a, and urge piston 168 axially downward in tube 166. However, once piston 168 axially abuts plug 167, piston 168 is prevented from continued downward axial movement within tube 166. If the pressure of lubricant in upper section 166a is higher than the pressure of drilling mud in annulus 18 proximal lower end 110b when piston 168 engages plug 167, a pressure differential will arise across piston 168 and lower seal assembly 180. If the pressure differential is sufficient to trigger check valve 168 to open (i.e., the pressure differentia reaches the predetermined pressure differential of check valve 164), lubricant axially disposed between seal assemblies 180, 190 will bleed through check valve 164 into drilling mud in annulus 18, thereby at least partially relieving the pressure differential across piston 168 and lower seal assembly 180. By allowing lubricant to bleed from between seal assemblies 180, 190 into annulus 18 at a predetermined pressure differential, check valve 164 offers the potential to reduce the likelihood of over-pressuring lower seal assembly 180.

Referring again to FIGS. 1 and 4, prior to drilling operations and downhole placement of bearing assembly 100, lubricant chamber 161 is filled with lubricant. Chamber 161 is preferably filled until piston 160 axially abuts and contacts upper housing shoulder 112a. Likewise, lower lubricant chamber 165 is filled with lubricant. Upper section 166a of tube 166 is preferably filled with lubricant until piston 168 axially abuts plug 167. Any voids or gaps between seal assemblies 170, 180 are also preferably filled with lubricant. Next, motor 20 including bearing assembly 100 may be run downhole on drill string 12.

When running bearing assembly 100 downhole, the temperature and volume of the lubricant in bearing assembly 100 may increase. As a result, the pressure of lubricant axially disposed between seal assemblies 170, 190 may increase, and/or the pressure of lubricant axially disposed between seal assemblies 180, 190 may increase. Pistons 160, 180 may move axially upward and downward, respectively, within annulus 130 and tube 166, respectively, to account for the lubricant volume increases, thereby maintaining a zero or relatively small pressure drop across seal assemblies 170, 180, respectively. However, once piston 160 engages shoulder 112a and piston 168 engages plug 167, further expansion of lubricant between seal assemblies 170, 190 and seal assemblies 180, 190, respectively, cannot be accommodated by the increase in the volume of chamber 161 and upper section 166a, respectively. However, as previously described, check valves 162, 164 allow lubricant between seal assemblies 170, 190 and between seal assemblies 180, 190, respectively, to bleed into drilling mud in drill string 12 and annulus 18, respectively, thereby at least partially relieving the pressure differential across seal assembly 170 and seal assembly 180, respectively.

Conversely, when tripping out of a borehole, the temperature and volume of lubricant in bearing assembly 100 may decrease. As a result, the pressure of lubricant axially disposed between seal assemblies 170, 190 may decrease, and/or the pressure of lubricant axially disposed between seal assemblies 180, 190 may decrease. Pistons 160, 180 may move axially downward and upward, respectively, within annulus 130 and tube 166, respectively, to account for the lubricant volume decrease, thereby maintaining a zero or relatively small pressure drop across seal assemblies 170, 180, respectively. However, once piston 160 engages shoulder 122a and piston 168 engages the upper end of tube 166, further contraction of lubricant between seal assemblies 170, 190 and seal assemblies 180, 190, respectively, cannot be accommodated by reduction in the volume of chamber 161 and upper section 166a, respectively. As a result, a pressure differential may develop across upper seal assembly 170 and across lower seal assembly 180 (e.g., the pressure of lubricant between seal assemblies 170, 190 may be less than the pressure of drilling mud in passage 111 proximal upper end 110a, and the pressure of lubricant between seal assemblies 180, 190 may be less than the pressure of drilling mud in annulus 18 proximal lower end 110b). Although check valves 162, 164 allow lubricant to bleed into drilling mud in passage 111 proximal upper end 110a and in annulus 18 proximal lower end 110b, respectively, at predetermine pressures, check valves 162, 164 do not permit drilling mud to pass into the bearing assembly (i.e., check valves 162, 164 only allow one-way fluid flow).

As previously described, during normal operations, there is a pressure differential across intermediate seal assembly 190. Specifically, the pressure of lubricant between seal assemblies 170, 190 is typically greater than the pressure of lubricant between seal assemblies 180, 190. Consequently, leakage of lubricant axially downward past seal member 191 and into annulus 132 is the likely failure mode of seal assembly 190. However, as intermediate seal assembly 190 separates lubricant axially above seal member 191 from lubricant axially below seal member 191, some leakage of lubricant across seal member 191 is generally not detrimental to bearing assembly 100. However, if the volume of lubricant leakage past seal member 191 is sufficiently large that piston 160 axially abuts shoulder 122a at the lower end of lubricant chamber 161, and thus, the volume of lubricant chamber 161 cannot be reduced further to accommodate a lubricant pressure that is less than the pressure of drilling mud in passage 111 at upper end 110a, drilling mud may begin to leak axially downward past upper seal assembly 170 to upper radial bearing 150. If drilling fluid moves beyond radial bearing 150 and into lubricant chamber 161, it may ultimately reach thrust bearing assembly 140 and lower radial bearing 151. At some point, one or more of thrust bearing assembly 140, radial bearing 150, and radial bearing 151 may pile up and/or washout, potentially requiring removal of motor 20 and replacement of bearing assembly 100. Thus, without being limited by this or any particular theory, the volume of lubricant chamber 161 divided by the average leakage rate past seal assembly 190 will usually establish the service life of bearing assembly 100 before maintenance is required.

By accommodating changes in the temperature, pressure, and volume of lubricant in bearing assembly 100 between seal assemblies 170, 190 and between seal assemblies 180, 190 as previously described, embodiments described herein offer the potential to maintain a zero or relatively small pressure differential across upper seal assembly 170 and lower seal assembly 180. By minimizing the pressure drop across seal assemblies 170, 180, embodiments described herein offer the potential to reduce the likelihood of extrusion and associated nibbling of seal members 171, 173, 181, thereby enhancing the operating lifetime of seal members 171, 173, 181. High-pressure seal assembly 190 experiences the drilling fluid pressure drops across the drill bit 15. However, lubricant is disposed on either side of seal assembly 190. Accordingly, in embodiments described herein, the only seal assembly experiencing a high pressure drop across—seal assembly 190—does not see drilling fluid during normal operation, only lubricant.

In the manner described, embodiments described herein provide sealing systems for downhole motor bearing assemblies. Embodiments of the sealing systems described herein restrict and/or prevent the ingress of drilling fluid into the lubricated bearings, thereby offering the potential to increase the durability and operating service life of the bearing assembly. Specifically, the sealing system includes lower seal assembly (e.g., seal assembly 180) positioned near the lower end of the bearing housing (e.g., near lower end 110b of housing 110). The lower seal assembly separates drilling mud below from lubricant above, however, there is little to no pressure drop across the lower seal assembly. The sealing system also includes an upper seal assembly (e.g., seal assembly 170) mounted along the radially inner surface of a hydraulic force-balanced piston (e.g., piston 160) along with an upper radial bearing (e.g., bearing 150). The upper seal assembly separates drilling mud above from lubricant below, however, there is little to no pressure drop across the upper seal assembly. The sealing system also includes a high-pressure seal assembly (e.g., seal assembly 190) positioned axially between the upper and lower seal assemblies. The high-pressure seal assembly experiences the drilling fluid pressure drops across the drill bit, however, the high-pressure seal assembly divides lubricant above from lubricant below.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A bearing assembly for a downhole motor, comprising:
    a housing having a central axis, an upper end, a lower end, a through passage extending between the upper end and the lower end, a radially inner surface defining the through passage, and a radially outer surface;
    a mandrel rotatably disposed within the through passage of the housing;
    an upper seal assembly radially positioned between the housing and the mandrel;
    a lower seal assembly radially positioned between the housing and the mandrel, wherein the lower seal assembly is axially positioned proximal the lower end of the housing;
    a thrust bearing assembly radially positioned between the housing and the mandrel, wherein the thrust bearing assembly is axially positioned between the upper seal assembly and the lower seal assembly;
    a lubricating fluid radially disposed between the housing and the mandrel and axially disposed between the upper seal assembly and the lower seal assembly;
    wherein the lower end of the housing comprises a first check valve radially positioned between the radially inner surface and the radially outer surface of the housing, wherein the check valve is in fluid communication with the lubricating fluid, wherein the first check valve is adapted to allow at least a portion of the lubricant to exit the bearing assembly at a predetermined pressure differential.

2. The bearing assembly of claim 1, wherein the housing comprises a lubricant chamber extending axially from the lower end of the housing and radially positioned between the inner surface of the housing and a radially outer surface of the housing, wherein the lubricant chamber is in fluid communication with the lubricating fluid.

3. The bearing assembly of claim 2, wherein the lubricant chamber is positioned in a counterbore extending axially from the lower end of the housing and includes a piston that divides the lubricant chamber into an upper section axially above the piston and a lower section axially below the piston, wherein the upper section is in fluid communication with the lubricating fluid.

4. The bearing assembly of claim 2, wherein the lower seal assembly comprises:
    an annular seal member disposed in an annular seal gland in the inner surface of the housing; and
    an annular wiper disposed in an annular gland in the inner surface of the housing, wherein the wiper is axially positioned below the seal member.

5. The bearing assembly of claim 2, further comprising:
    a first radial bearing axially positioned between the upper seal assembly and the lower seal assembly;
    a second radial bearing axially positioned between the upper seal assembly and the lower seal assembly and axially disposed below the first radial bearing;
    wherein the first radial bearing and the second radial bearing is radially positioned between the mandrel and the housing.

6. The bearing assembly of claim 5, wherein the thrust bearing assembly comprises a bi-directional thrust bearing.

7. The bearing assembly of claim 2, further comprising an intermediate seal assembly radially positioned between the housing and the mandrel, and axially positioned between the upper bearing assembly and the lower bearing assembly; and
    wherein the lubricating fluid comprises a first portion of lubricant axially positioned between the upper seal assembly and the intermediate seal assembly, and a second portion of lubricant axially positioned between the lower seal assembly and the intermediate seal assembly, wherein the intermediate seal assembly is adapted to restrict fluid communication between the first portion of lubricant and the second portion of lubricant.

8. The bearing assembly of claim 7, further comprising an annular piston radially positioned between the mandrel and the housing and axially positioned above the intermediate seal assembly, wherein the upper seal assembly is mounted to the piston.

9. The bearing assembly of claim 8, wherein the upper sealing assembly comprises a first annular seal member radially positioned between the piston and the mandrel, the first annular seal member being disposed in an annular seal gland formed in a radially inner surface of the piston.

10. The bearing assembly of claim 8, wherein the upper seal assembly further comprises:
    a second annular seal members radially positioned between the piston and the housing, and
    a wiper radially positioned between the piston and the mandrel, wherein the wiper is positioned axially above the first annular seal member.

11. The bearing assembly of claim 8, wherein the piston comprises a second check valve in fluid communication with the first portion of lubricant, wherein the second check valve is adapted to allow at least a portion of the first portion of lubricant to exit the bearing assembly at a predetermined pressure differential.

12. A method for drilling a borehole, comprising:
    (a) providing a bearing assembly comprising:
        a housing having a central axis;
        a mandrel coaxially disposed within the housing;
        an upper seal assembly, a lower seal assembly axially positioned below the upper seal assembly, and an intermediate seal assembly axially positioned between the upper seal assembly and the lower seal assembly, wherein each seal assembly is radially positioned between the housing and the mandrel;

a first portion of lubricant axially disposed between the upper seal assembly and the intermediate seal assembly and a second portion of lubricant axially disposed between the lower seal assembly and the intermediate seal assembly; and a thrust bearing assembly axially disposed between the upper seal assembly and the lower seal assembly, and radially disposed between the housing and the mandrel;

(b) coupling the bearing assembly to a rotor-stator assembly and a drill bit;

(c) pumping a drilling fluid down a drill string through the rotor-stator assembly, the bearing assembly, and the drill bit into an annulus radially positioned between the drill string and a borehole sidewall;

(d) restricting fluid communication between the drilling fluid in the drill string and the first portion of lubricant with the upper seal assembly during (c);

(e) restricting fluid communication between the drilling fluid in the annulus and the second portion of lubricant with the lower seal assembly during (c);

(f) restricting fluid communication between the first portion of lubricant and the second portion of lubricant with the intermediate seal assembly during (c);

(g) flowing a third portion of lubricant from a lubricant chamber disposed in the housing into the second portion of lubricant or flowing at least some of the second portion of lubricant into the lubricant chamber disposed in the housing.

13. The method of claim 12, further comprising:

(h) maintaining the pressure of the first volume of lubricant substantially the same as the pressure of the drilling fluid in the drill string at the bearing assembly; and (i) maintaining the pressure of the second volume of lubricant substantially the same as the pressure of the drilling fluid in the annulus proximal the bearing assembly.

14. The method of claim 12, further comprising flowing at least some of the second portion of lubricant through a check valve into the drilling fluid in the annulus while advancing the bearing assembly downhole with the drillstring.

15. The method of claim 12, further comprising flowing at least some of the first portion of lubricant through a check valve into the drilling fluid in the drill string while advancing the bearing assembly downhole with the drillstring.

16. The method of claim 12, wherein the lubricant chamber extends axially from a lower end of the housing, the check valve extends from the lower end of the housing and is circumferentially spaced from the lubricant chamber.

17. A downhole motor for powering the rotation of a drill bit, comprising:

a power section including a stator and a rotor rotatably disposed in the stator;

a bearing assembly comprising:

a housing having a central axis, an upper end coupled to the stator, and a lower end, and a through passage extending between the upper end and the lower end;

a mandrel rotatably disposed within the through passage of the housing;

an upper seal assembly radially positioned between the housing and the mandrel;

a lower seal assembly radially positioned between the housing and the mandrel, wherein the lower seal assembly is axially positioned below the upper seal assembly;

an intermediate seal assembly radially positioned between the housing and the mandrel, wherein the intermediate sleeve is axially positioned between the upper seal assembly and the lower seal assembly;

a thrust bearing assembly radially positioned between the housing and the mandrel, wherein the thrust bearing assembly is axially positioned between the upper seal assembly and the lower seal assembly;

a lubricating fluid radially disposed between the housing and the mandrel and axially disposed between the upper seal assembly and the lower seal assembly, wherein the intermediate seal assembly divides the lubricating fluid into a first portion axially disposed between the upper seal assembly and the intermediate seal assembly and a second portion axially disposed between the lower seal assembly and the intermediate seal assembly;

wherein the lower end of the housing comprises a lubricant chamber radially positioned between a radially inner surface of the housing and a radially outer surface of the housing.

18. The motor of claim 17, further comprising a piston disposed in the lubricant chamber, the piston dividing the lubricant chamber into an upper section in fluid communication with the second portion of the lubricating fluid and a lower section isolated from the upper section.

19. The motor of claim 17, further comprising a first check valve in fluid communication with the lubricating fluid, wherein the first check valve is adapted to allow at least a portion of the lubricating fluid to exit the bearing assembly at a predetermined pressure differential.

20. The motor of claim 17, wherein the lower seal assembly comprises an annular seal member disposed in an annular seal gland in the inner surface of the housing, the radially inner surface of the seal member forming a dynamic seal with the mandrel and the radially outer surface of the seal member forming a static seal with the housing.

21. The motor of claim 20, further comprising a radial bearing axially positioned between the upper seal assembly and the lower seal assembly, wherein the radial bearing engages the mandrel and the housing.

* * * * *